US008919736B2

(12) United States Patent
Tjader

(10) Patent No.: US 8,919,736 B2
(45) Date of Patent: *Dec. 30, 2014

(54) PULLING DEVICE AND METHOD THEREFOR

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,004

(22) Filed: Jun. 7, 2013

(65) Prior Publication Data

US 2013/0270499 A1    Oct. 17, 2013

Related U.S. Application Data

(63) Continuation of application No. 12/560,823, filed on Sep. 16, 2009, now Pat. No. 8,474,795.

(60) Provisional application No. 61/097,372, filed on Sep. 16, 2008.

(51) Int. Cl.
| | | |
|---|---|---|
| *B66D 1/36* | (2006.01) | |
| *B66D 1/26* | (2006.01) | |
| *F16L 55/165* | (2006.01) | |
| *F16L 55/18* | (2006.01) | |

(52) U.S. Cl.
CPC ............... *B66D 1/26* (2013.01); *F16L 55/1658* (2013.01); *F16L 55/18* (2013.01)
USPC .......................... 254/280; 254/290; 405/184.4

(58) Field of Classification Search
USPC ......... 254/278, 280, 290, 293, 339, 342, 344, 254/134.3 FT; 405/184.3, 184.1
See application file for complete search history.

(56) References Cited

U.S. PATENT DOCUMENTS

| | | | |
|---|---|---|---|
| 505,065 A * | 9/1893 | Shaw ........................... | 414/626 |
| 1,741,315 A | 12/1929 | Homer | |
| 2,552,705 A | 5/1951 | Baldwin | |
| 3,965,841 A | 6/1976 | Croese | |
| 4,003,272 A | 1/1977 | Volkov et al. | |
| 4,677,273 A | 6/1987 | Colegrove et al. | |
| 5,174,686 A | 12/1992 | Raymond | |
| 5,544,977 A | 8/1996 | Cravy et al. | |
| 6,672,802 B2 | 1/2004 | Putnam | |

(Continued)

OTHER PUBLICATIONS

"U.S. Appl. No. 11/215,316, 312 Amendment filed Dec. 27, 2007", 5 pgs.
"U.S. Appl. No. 11/215,316, Final Office Action mailed Aug. 22, 2007", 4 pgs.
"U.S. Appl. No. 11/215,316, Non-Final Office Action mailed Mar. 7, 2007", 7 pgs.
"U.S. Appl. No. 11/215,316, Notice of Allowance mailed Sep. 27, 2007", 4 pgs.

(Continued)

*Primary Examiner* — Emmanuel M Marcelo
(74) *Attorney, Agent, or Firm* — Schwegman Lundberg & Woessner, P.A.

(57) ABSTRACT

A puller is provided with a number of advantages. Pullers are described that have a high power to weight ratio, and a high power to volume ratio. Examples of pullers and pulling systems include configurations that provide high cable friction in a small device volume. Examples of pullers and pulling systems also include constant force pulling which is desirable in particular for small diameter pipe replacement. Using pullers and pulling systems as described, minimally invasive pipe replacement operations are possible. Reversible pullers are also provided that decrease the amount of time needed to burst or split multiple segments of pipe.

17 Claims, 8 Drawing Sheets

(56) References Cited

U.S. PATENT DOCUMENTS

| | | |
|---|---|---|
| 6,827,334 B2 | 12/2004 | Volle et al. |
| 6,854,932 B2 | 2/2005 | Putnam |
| 7,025,536 B2 | 4/2006 | Putnam |
| 7,156,585 B2 | 1/2007 | Wang et al. |
| 7,175,367 B2 | 2/2007 | Hau |
| 7,270,312 B1 | 9/2007 | Phipps et al. |
| 7,341,404 B2 | 3/2008 | Tjader |
| 7,364,136 B2 | 4/2008 | Hossler |
| 7,503,548 B2 | 3/2009 | Arzberger et al. |
| 7,896,315 B2 | 3/2011 | Faust |
| 8,474,795 B2 | 7/2013 | Tjader |
| 2003/0111651 A1 | 6/2003 | Volle et al. |
| 2005/0179017 A1 | 8/2005 | Wang et al. |
| 2006/0022182 A1 | 2/2006 | Blanc |
| 2006/0056919 A1 | 3/2006 | Tjader |
| 2010/0067988 A1 | 3/2010 | Tjader |
| 2010/0224844 A1 | 9/2010 | Boussaton et al. |

OTHER PUBLICATIONS

"U.S. Appl. No. 11/215,316, PTO Response to 312 Amendment mailed Feb. 4, 2008", 2 pgs.

"U.S. Appl. No. 11/215,316, Response filed Jun. 6, 2007 to Non-Final Office Action filed Mar. 7, 2007", 8 pgs.

"U.S. Appl. No. 11/215,316, Response filed Sep. 5, 2007 to Final Office Action mailed Aug. 22, 2007", 5 pgs.

"U.S. Appl. No. 12/560,823, Final Office Action mailed Dec. 20, 2012", 5 pgs.

"U.S. Appl. No. 12/560,823, Non Final Office Action mailed Aug. 13, 2012", 9 pgs.

"U.S. Appl. No. 12/560,823, Notice of Allowance mailed Mar. 7, 2013", 5 pgs.

"U.S. Appl. No. 12/560,823, Response filed Feb. 20, 2013 to Final Office Action mailed Dec. 20, 2012", 8 pgs.

"U.S. Appl. No. 12/560,823, Response filed Nov. 13, 2012 to Non Final Office Action mailed Aug. 13, 2012", 10 pgs.

* cited by examiner

PULLING DEVICE AND METHOD THEREFOR

RELATED APPLICATIONS

This application is a continuation of U.S. patent application Ser. No. 12/560,823, filed on Sep. 16, 2009, which claims the benefit of priority, under 35 U.S.C. §119(e), to U.S. Provisional Patent Application Ser. No. 61/097,372, filed on Sep. 16, 2008, which is incorporated herein by reference in its entirety.

This application is related to U.S. patent application Ser. No. 11/215,316, entitled "DUAL CAPSTAN PULLER AND METHOD", filed Aug. 29, 2005, the disclosure of which is incorporated herein by reference.

TECHNICAL FIELD

This invention relates to pulling equipment. Specifically, this invention relates to pulling equipment for use in trenchless pipe replacement.

BACKGROUND

Pipe materials such as cast iron, ductile iron, copper, etc. have been used for connecting homes and creating networks for utilities such as water, sewer, or gas, etc. For any number of reasons, an existing pipe may crack or break, necessitating replacement of the pipe.

Trenchless pipe replacement is a currently known technique that replaces underground pipe without the need to dig up the pipe to be replaced. A pipe breaking device such as an expander, burster, cutter, etc. is pulled or pushed through the existing pipe while it is still underground. The pipe breaking device is designed to break or cut the pipe, and at the same time to expand the old pipe into the surrounding soil. The expansion of the old pipe allows the pipe breaking device to concurrently pull a replacement pipe into place.

Trenchless pipe replacement has typically been employed on large diameter pipe such as water or sewer main lines. Due to the size of pipe in these types of replacements, the equipment used for pulling or pushing the expander through the pipe requires a great deal of force. As a result, common equipment in the industry for pulling or pushing the expander is relatively large and expensive such as an above ground winch and pulley system. These larger scale methods also commonly require a large access pit to be excavated on at least one end of the pipe to be replaced.

More recently, the technique of trenchless pipe replacement has been employed for smaller diameter pipe such as for lateral lines and even individual line service to homes such as copper lines. Improved devices and methods for replacement of these smaller diameter lines are needed as the industry expands. Some goals for device and method improvement include lower cost, light weight/portable device designs, and small entry and exit pits.

SUMMARY

The above mentioned problems such as low cost, light weight puller devices and systems adapted for use with small exit and entry pits are addressed by the present invention and will be understood by reading and studying the following specification.

In one example, a pulling device is provided. The pulling device includes a puller body having at least one opening configured to allow a flexible line to pass therethrough. First and second gear reductions are coupled with the puller body. The first and second gear reductions each include an input and an output. A first drive motor is coupled to the input of the first gear reduction. A second drive motor is coupled to the input of the second gear reduction. A first drum is coupled to the output of the first gear reduction. A second drum is coupled to the output of the second gear reduction. The first and second drums are configured to grip and pull the flexible line with rotation of the first and second drums. The flexible line contacts the first drum substantially immediately after passing through the opening.

In another example, a pulling device is provided. The pulling device includes first and second gear reductions coupled with the pulling device. The first and second gear reductions each include an input and an output. A first drive motor is coupled to the input of the first gear reduction. A second drive motor is coupled to the input of the second gear reduction. A first drum is coupled to the output of the first gear reduction. A second drum is coupled to the output of the second gear reduction. The first and second drums are configured to grip and pull a flexible line with rotation of the first and second drums. An intermediate roller is disposed within the puller body between the first and second drums. The intermediate roller is canted with respect to an axis of rotation of at least one of the first and second drums.

In yet another example, a method of using a pulling device is provided. The method includes routing a flexible line around at least first and second powered drums of the pulling device. The pulling device, in a first orientation, is coupled to a force distributing device. The pulling device and force distributing device are placed within a pipe access pit. A first end of the flexible line is inserted through an existing pipe. The first end of the flexible line is coupled to a pipe working tool. At least the first and second powered drums of the pulling device are rotated to pull the flexible line, thereby pulling the pipe working tool toward the pulling device. The flexible line is wound directly onto the first powered drum after exiting the existing pipe.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1:
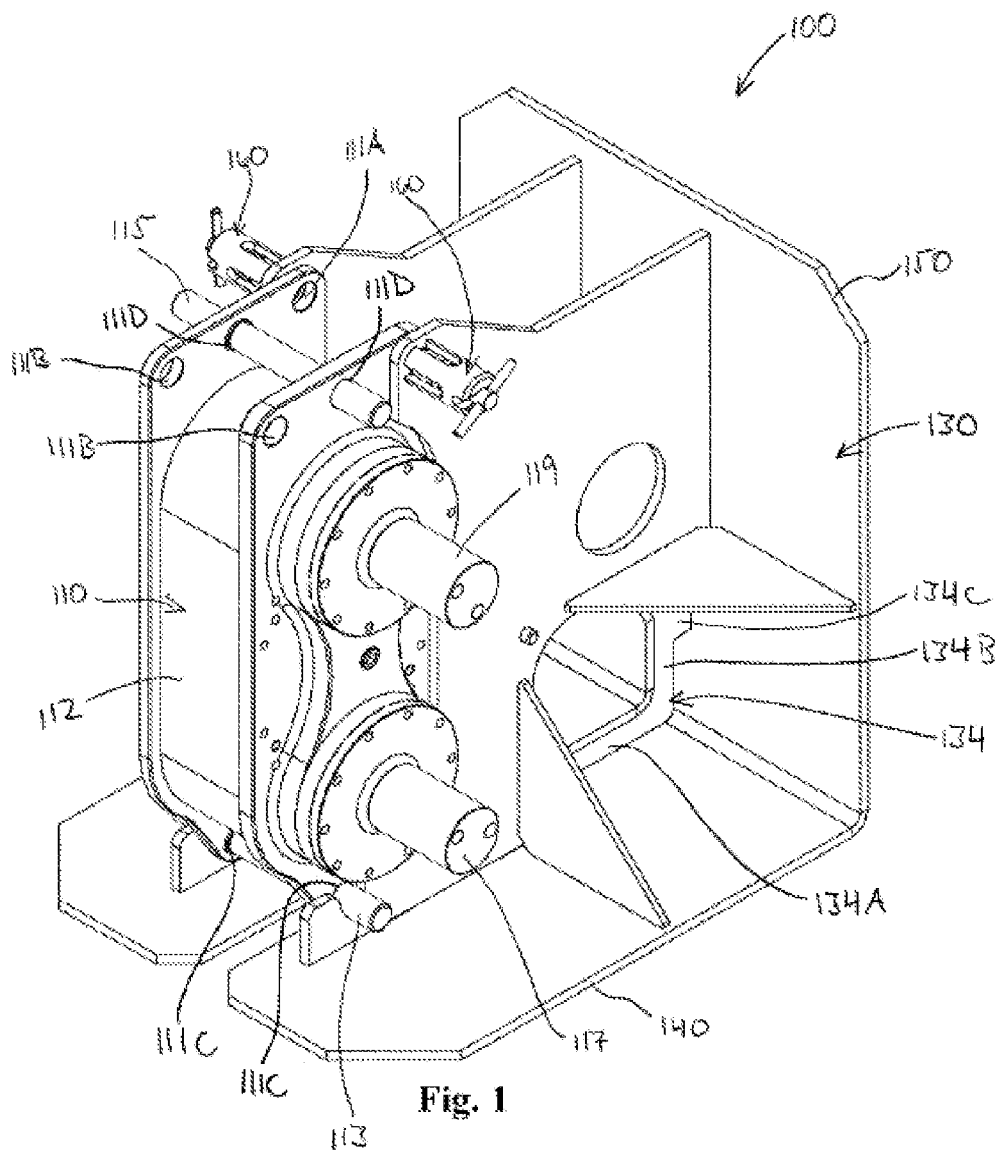
FIG. 1 shows a perspective view of a pulling system according to an embodiment of the invention.

In the following detailed description, reference is made to the accompanying drawings which form a part hereof, and in which is shown, by way of illustration, specific embodiments in which the invention may be practiced. These embodiments are also referred to herein as "examples." In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In the following detailed description, the term flexible line, or cable includes wire rope, and cables or ropes made from a number of materials including steel. Although an operation of pipe replacement is discussed at length in examples below, elements of the invention can be used in other applications and industries. Some aspects of the invention are therefore not limited to pipe replacement.

As discussed in the background above, it is desirable to provide a puller and pulling system that is lightweight, easy to transport in a small vehicle such as a pickup truck, etc., and easy for a small work crew to assemble and use.

Figure 2:
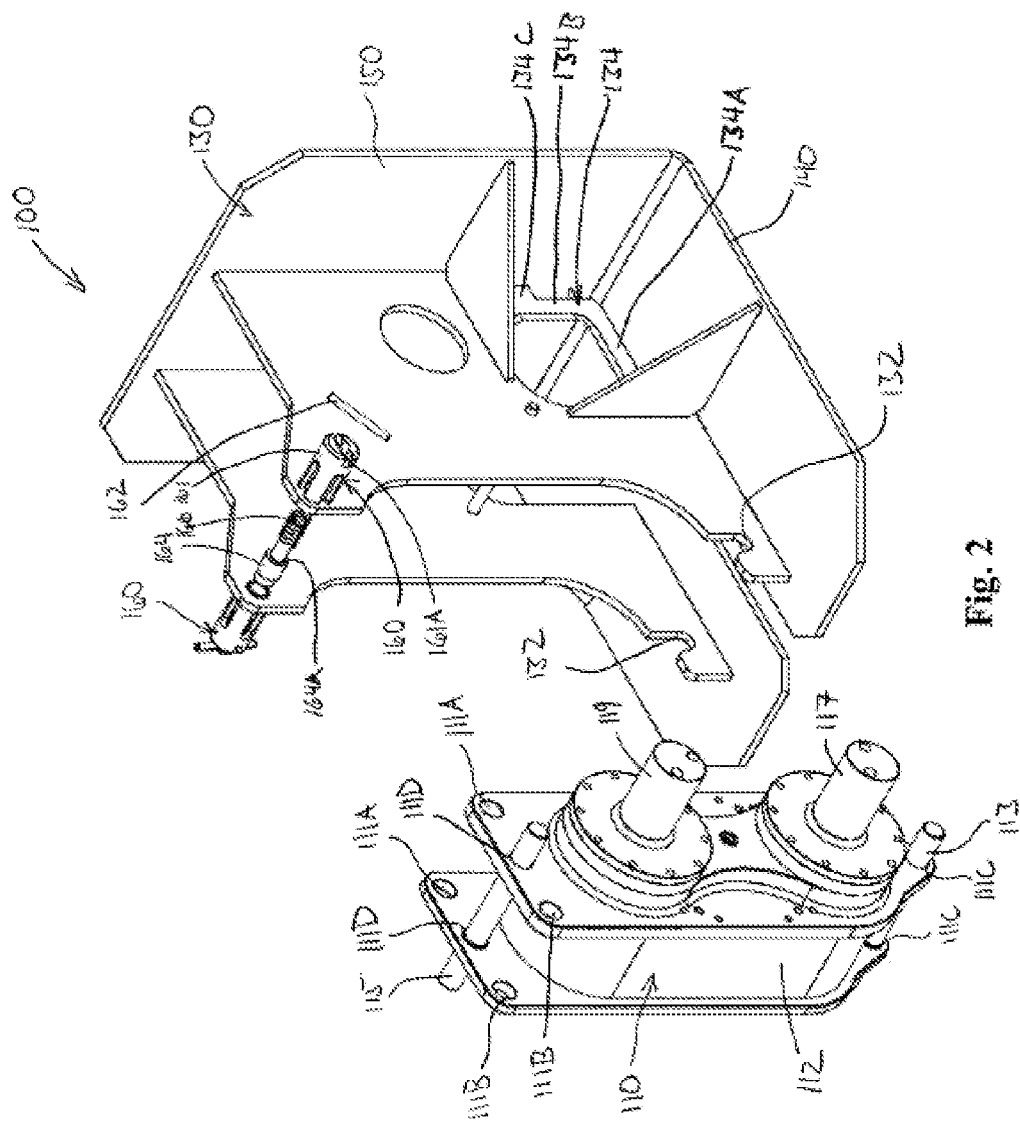
FIG. 2 shows a partially-exploded perspective view of a pulling system according to an embodiment of the invention.

FIGS. 1 and 2 show a pulling system 100 according to an embodiment of the invention. A pulling device 110, also referred to hereafter as a puller 110, is shown. As will be discussed in more detail below, the puller 110 is lightweight and easy to transport, and also highly powerful, reliable, and easy to operate. In one example, the puller 110 is configured to pull a flexible line 310 (see FIG. 6). Examples of the flexible line 310 include, but are not limited to, rope, steel cable, wire rope, etc. In one example, the flexible line 310 includes 5/16-inch diameter steel cable. In another example, the flexible line 310 includes 3/8-inch diameter steel cable. It is noted that, while specific diameters of the steel cable are stated above, these sizes of steel cable are not intended to be limiting, and it should be understood that the puller 110 of the present disclosure can be configured to pull any size of steel cable, or any other type of flexible line 310. In one example, the puller 110 is configured to be coupled with a force distributing device 130, as will be described in more detail below.

As discussed in the background above, there is a need for improved pullers and systems for small diameter pipe replacement. In one embodiment, pullers and systems described above are adapted for use with pipe as small as ½" to 1" pipe. Examples of pipe that are suitable for pullers and systems described herein include, but are not limited to, iron pipe and copper pipe. In one embodiment, a small cable is necessary to replace such small diameter pipe. In one embodiment a ¼ cable is used.

When using small diameter cable to burst or split an existing pipe, one factor to be taken into account in puller designs is that the forces needed for bursting or splitting are close to a tensile strength of many possible cable choices. In one embodiment, a constant pulling force provided by a puller is desirable in contrast to cyclic tugging because the tensile strength of the cable is less likely to be exceeded. Constant pulling tends to keep a bursting or cutting head moving and thus subject to sliding friction within the pipe to be replaced. In contrast, tugging tends to include several stops and starts on the bursting or cutting head. Generally starting friction is higher than sliding friction, thus constant force pulling provides a lower and more consistent bursting or cutting operation. Design features such as a harmonic drive gear reduction and other features described below provide a high power, constant pulling force, and in addition provide low overall device weight.

Figure 3:
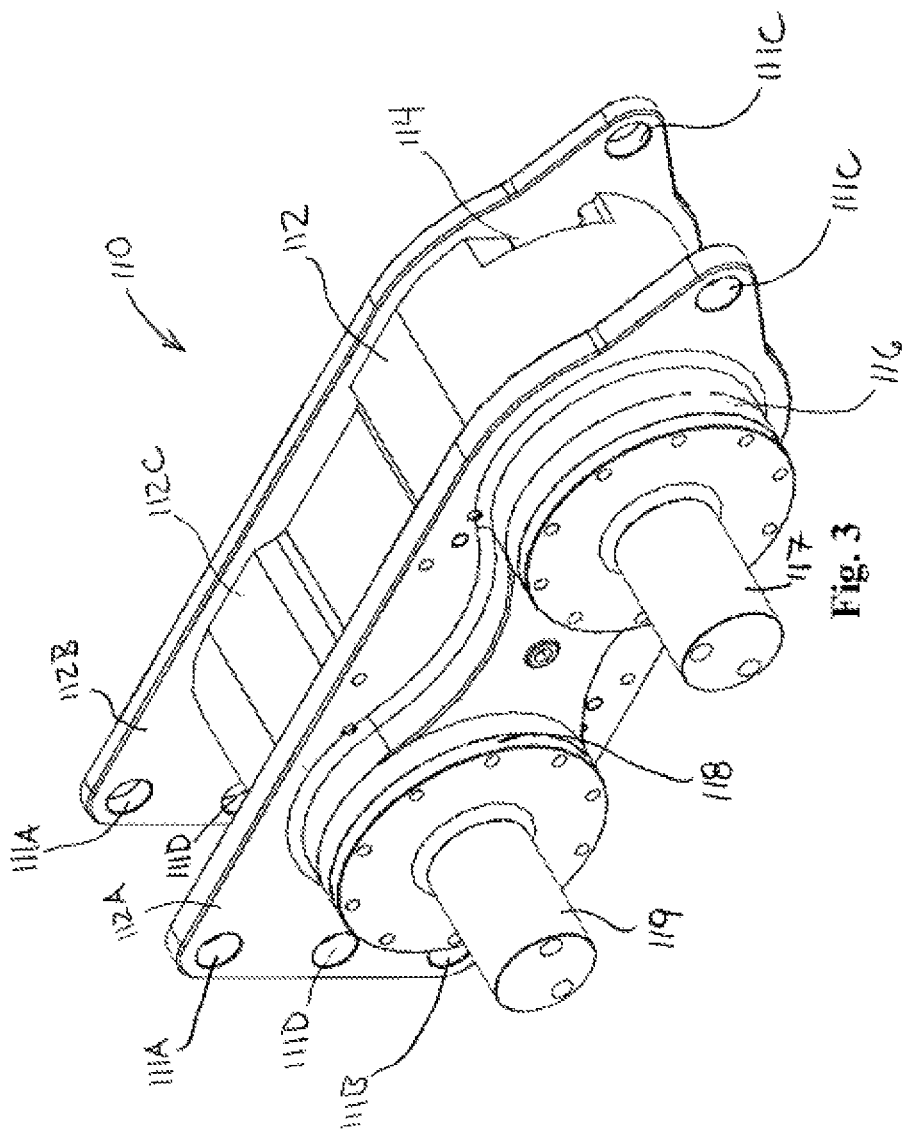
FIG. 3 shows a perspective view of a pulling device according to an embodiment of the invention.
Figure 4:
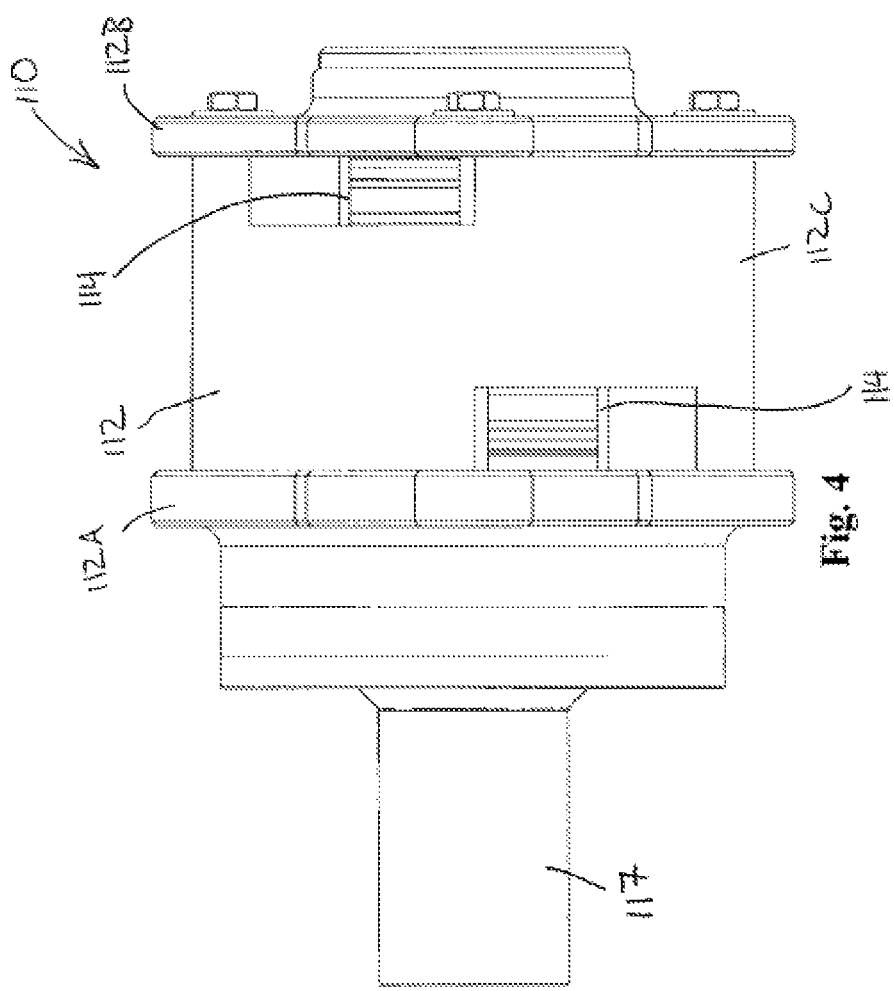
FIG. 4 shows an end view of a pulling device according to an embodiment of the invention.

Referring to FIGS. 3 and 4, in one example, the puller 110 includes a puller body 112 to at least partially enclose components of the puller 110. In one example, the puller body 112 includes first and second plates 112A, 112B attached to opposite ends of a side wall 112C. It is noted that this configuration of the puller body 112 is but one example and that other examples including differently constructed configurations of the puller body 112 are contemplated herein. The puller body 112, in one example, includes at least one opening 114 configured to allow the flexible line 310 to pass therethrough. In another example, the puller body 112 includes more than one opening 114. For instance, in one example, the puller body 112 includes two openings 114, one opening 114 to allow the flexible line 310 to pass into the puller body 112 and the other opening 114 to allow the flexible line 310 to exit the puller body 112, for instance, to allow the flexible line 310 to be coiled, spooled, stacked, or otherwise configured while not being used. In a further example, the flexible line 310 passes into and out of the puller body 112 through the same opening 114. In one example, except for the one or more openings 114 for the flexible line 310, the puller body 112 encloses the components of the puller 110. Advantages of this enclosed configuration of the puller body 112 include, but are not limited to, enhancing reliability of the puller 110 by inhibiting incursion of dirt, rocks, mud, and other debris within the puller 110 and increasing safety during use of the puller 110 by inhibiting a person contacting moving parts within the puller 110 with, for instance, a finger or other body part or a piece of clothing.

The puller 110, in one example, includes first and second gear reductions 116, 118 coupled with the puller body 112. The first and second gear reductions 116, 118 each include an input 116A, 118A and an output 116B, 118B. In one example, each of the first and second gear reductions 116, 118 includes a harmonic gear reduction. Use of a harmonic drive gear reduction provides a number of advantages. One advantage includes a large mechanical advantage with very little weight in the device. In one embodiment, a mechanical advantage from the harmonic drive gear reduction is approximately 200 to 1. Another advantage of a harmonic drive gear reduction includes a small number of moving parts which in turn provides a reliable device with fewer parts that could possibly fail during use. Another advantage of a harmonic drive gear reduction includes a high number of teeth operatively in contact between an input and output of the harmonic drive gear reduction. The large number of teeth in contact provides a high strength to weight ratio of the harmonic drive gear reduction.

In another example, each of the first and second gear reductions 116, 118 includes a planetary gear reduction. Use of such a planetary gear reduction provides a number of advantages, including, for instance, a large mechanical advantage.

The puller 110, in one example, further includes first and second drive motors 117, 119. In one example, the first drive motor 117 is coupled to the input 116A of the first gear reduction 116, and the second drive motor 119 is coupled to the input 118A of the second gear reduction 118. In one example, the first and second drive motors 117, 119 are reversible. In one embodiment, the first and second drive motors 117, 119 include hydraulic drive motors. Other drive motors include, but are not limited to servo motors or other electrical motors. It is noted that in some examples, the first drive motor 117 can be a different type of motor than the second drive motor 119. Additionally, although the puller 110 is shown herein as including two drive motors and two drive gear reductions, the invention is not so limited. For instance, the puller 110 can include more or less than two drive motors and two gear reductions.

Figure 5:
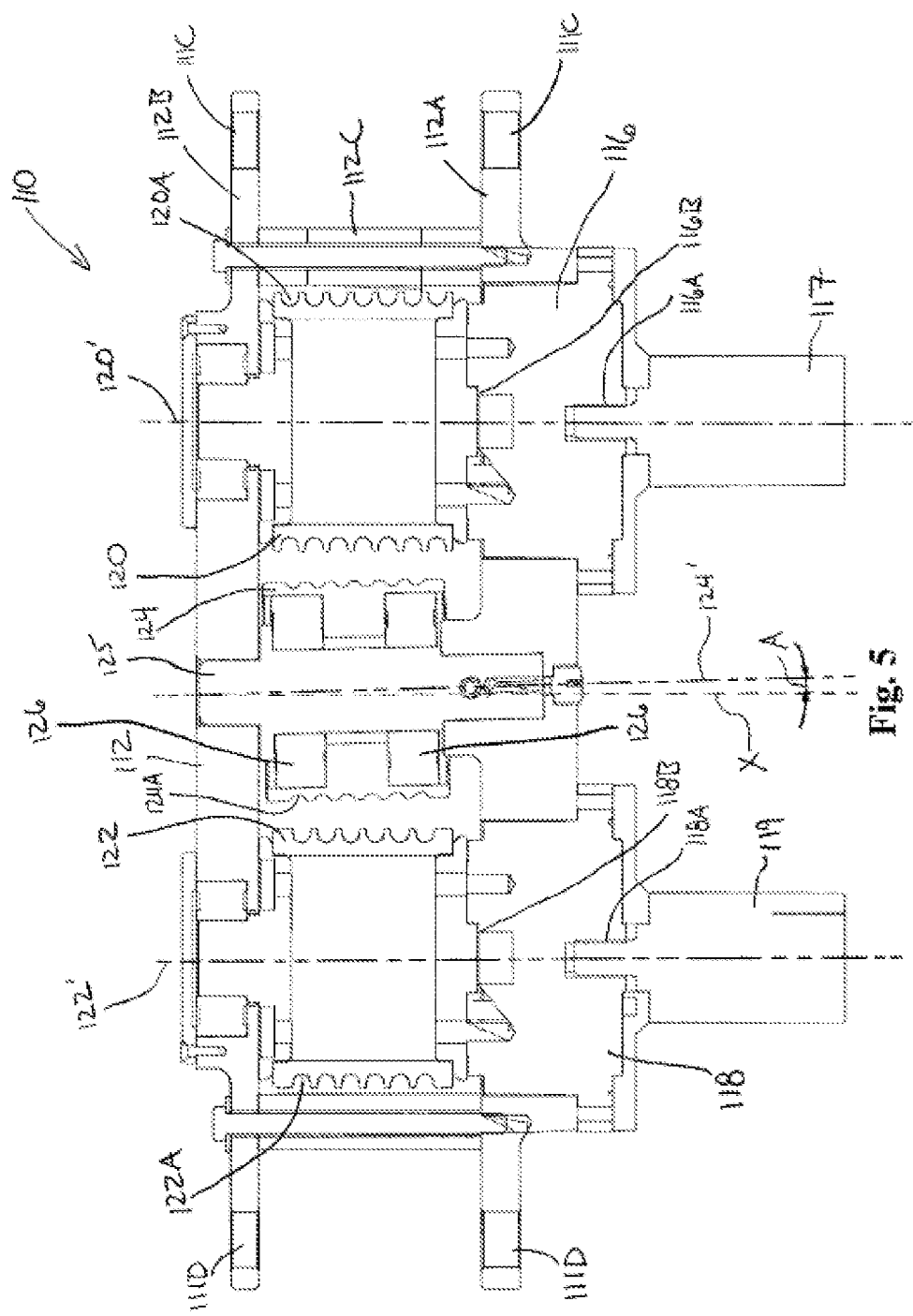
FIG. 5 shows a side view of a pulling device according to an embodiment of the invention.
Figure 6:
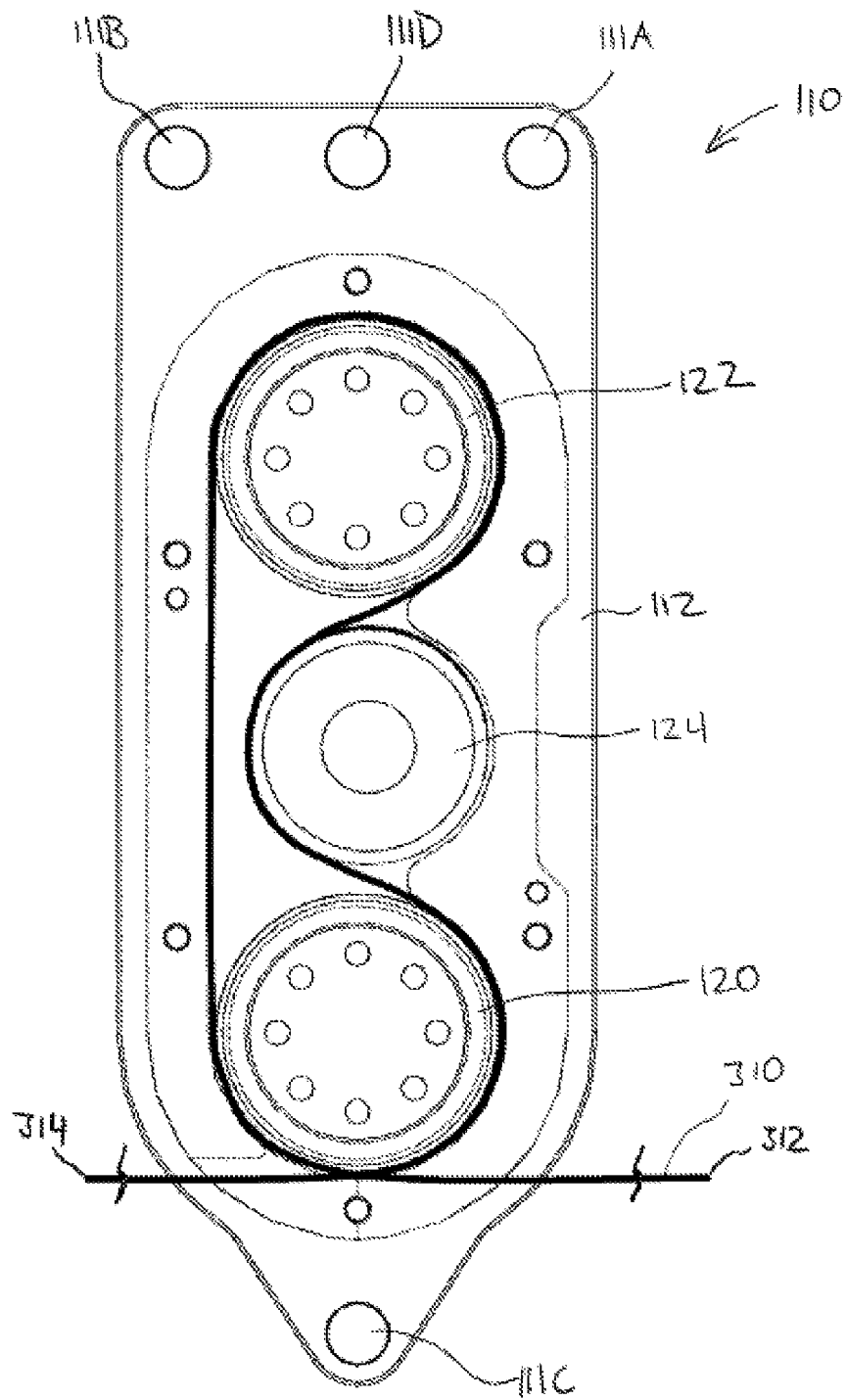
FIG. 6 shows a side cross-section of a pulling device according to an embodiment of the invention.

Referring to FIGS. 4-6, the puller 110, in one example, includes first and second drums 120, 122. In one example, the flexible line 310 wraps around the first and second drums 120, 122 within the puller 110. When high pulling forces are needed to burst or cut a pipe, equally high reaction forces such as friction forces are needed within the puller 110. Multiple drums provide a higher friction surface area, and thus a higher friction advantage acting on the flexible line 310. Although two drums 120, 122 are shown, a single drum example is also within the scope of the invention, and examples with more than two drums are also within the scope of the invention.

In one example, the first drum 120 is coupled to the output 116B of the first gear reduction 116, and the second drum 122 is coupled to the output 118B of the second gear reduction 118. The first and second drums 120, 122 are configured to rotate with the outputs 116B, 118B, respectively. The first and second drums 120, 122 are configured to grip and pull the flexible line 310 with rotation of the first and second drums 120, 122. In one example, the first and second drive motors 117, 119 are reversible to rotate the first and second drums 120, 122 in either of two directions, thereby allowing pulling of the flexible line 310 in either of two directions, depending upon the direction of rotation of the first and second drums 120, 122.

In one embodiment each drum 120, 122 is adapted to accept multiple windings of the flexible line 310. As discussed above, high friction is desirable to provide high pulling forces for bursting or cutting. In one example, five or more windings are used on a drum to increase friction. In one example, the flexible line 310 is wound around at least one of the first and second drums 120, 122 at least once to increase friction between the flexible line 310 and at least one of the first and second drums 120, 122. In one example, the first and second drums 120, 122 include a friction surface that includes space for multiple windings of a cable or other flexible line 310. Although the cable contacting surfaces of the drums 120, 122 can be flat, in one example, cable grooves are formed into the drums. Grooves further increase contact surface area that in turn increases friction with the cable. In one example, the friction surface of at least one of the first and second drums 120, 122 includes grooves 120A, 122A configured to accommodate the flexible line 310 therein in order to facilitate winding of the flexible line 310 at least partially around at least one of the first and second drums 120, 122. As seen in FIG. 5, in one example, at least one of the first and second drums 120, 122 is hollow. In another example, both of the first and second drums 120, 122 are hollow. Advantages of at least one of the first and second drums being hollow include weight savings in the puller 110, making the puller 110 and pulling system 100 lighter and, in turn, generally more manageable during transport, carrying, setting-up, etc.

FIG. 6 shows a cross section of a puller 110 according to an example of the invention with the flexible line 310 routed through the puller 110. A first end 312 and a second end 314 of the flexible line 310 are shown at entry/exit locations of the puller 110. In one embodiment, the puller 110 is reversible, such that the first end 312 or the second end 314 could be used as either an entry or exit location of the puller 110 depending on the direction of puller operation.

In one example, the first drum 120 is positioned within the puller 110 proximate the at least one opening 114 in the puller body 112. In one example, the flexible line 310 contacts the first drum 120 substantially immediately after passing through the opening 114 during pulling of the flexible line 310. That is, the flexible line 310 contacts the first drum 120 shortly after, if not immediately after, passing into the puller 110 through the opening 114. In one example, the flexible line 310 is wound directly onto the first drum 120 after entering the puller body 112. By configuring the puller 110 to wind the flexible line 310 directly onto the first drum 120, no guide rollers, drums, pins, or the like are required to route the flexible line 310 from outside of the puller body 112 onto the first drum 120, thereby reducing or eliminating a possible source of system losses, such as from friction or heat. By reducing or eliminating such system losses, the puller 110 has an increased efficiency, such that more pulling power is transferred into the job, rather than incurring system losses as a result of additional pulleys, guide wheels, etc.

Referring to FIG. 5, the puller 110, in one example, includes an intermediate roller 124 disposed within the puller body 112 between the first and second drums 120, 122. In one example, the intermediate roller 124 is canted with respect to an axis of rotation 120' or 122' of at least one of the first and second drums 120, 122. For instance, as shown in FIG. 5, an axis of rotation 124' of the intermediate roller 124 is canted by an angle A from a line X, which is parallel to at least one of the axes of rotation 120', 122' of the first and second drums 120, 122. In one example, the intermediate roller 124 rotates about an intermediate axle 125. Bearings 126 are used in one example to facilitate rotation of the intermediate roller 124 about the intermediate axle 125. In various examples, the bearings 126 include ball bearings, roller bearings, ball thrust bearings, roller thrust bearings, or tapered roller thrust bearings. In other examples, no bearings are used and, instead, bushings or other such friction-reducing members are used to facilitate rotation of the intermediate roller 124 about the intermediate axle 125. In yet another example, the intermediate roller 124 rides directly on the intermediate axle 125.

In one example, the intermediate roller 124 includes a grooved outer surface 124A. The grooved outer surface 124A allows for a prescribed wind pattern of the flexible line 310 on the intermediate roller 124. In one example, the grooved outer surface 124A includes one generally spirally-wound groove extending around the intermediate roller 124. In another example, the grooved outer surface 124A includes several grooves extending around the intermediate roller 124. The groove or grooves of at least some of the examples of the grooved outer surface 124A are configured to accommodate the flexible line 310 at least partially therein.

As described above, in one example, the intermediate roller 124 is canted. By canting the intermediate roller 124 in this way, forces on the intermediate roller 124, for instance, from the flexible line 310 at least partially wound therearound, can be lessened. For instance, such a canted configuration can reduce frictional forces between the intermediate roller 124 and the bearings 126, the bushing, or the intermediate axle 125. By reducing such frictional forces, wear and tear of the puller 110, specifically that of the intermediate roller 124 and the components thereof, can be lessened and the life of the puller 110 can be extended. Additionally, in one example, by canting the intermediate roller 124, the grooves of the grooved outer surface 124A align the grooves 120A, 122A of the first and second drums 120, 122 to reduce cable wear and groove wear. That is, canting the intermediate roller 124 aligns the grooves 120A, 122A of the first and second drums 120, 122 and the grooved outer surface 124A of the intermediate roller 124 to reduce, if not eliminate, the amount that the flexible line 310 wears against the grooves 120A, 122A and the grooves of the grooved outer surface 124A, thereby reducing cable wear and groove wear.

The examples of pulling devices 110 described herein provide high constant pulling forces, in contrast to a tugging force. High amounts of friction are provided using designs described herein in a small device that is light weight. Devices as described herein therefore have a high power to puller weight ratio, and a high power to puller volume ratio.

Figure 7:
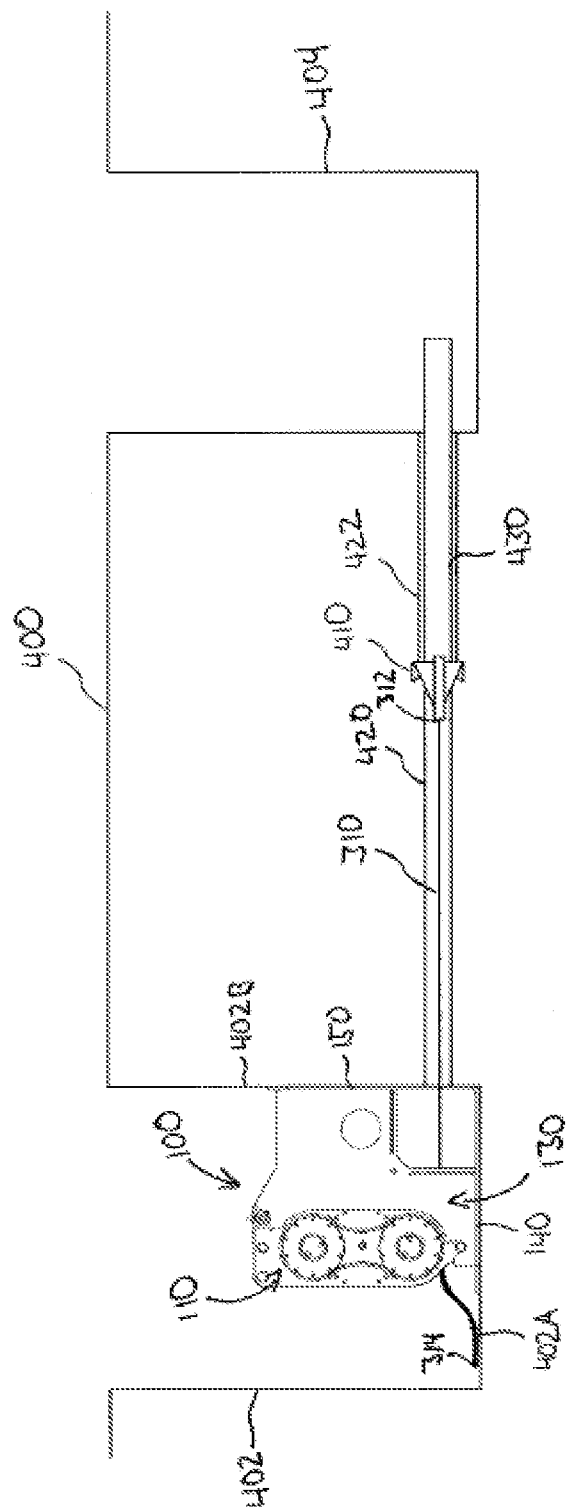
FIG. 7 shows a side view of a pulling system in operation according to an embodiment of the invention.

Referring now to FIGS. 1, 2, and 7, in one example, the pulling device 110 of the pulling system 100 is configured to be coupled with a force distributing device 130. In one example, the force distributing device 130 is configured to spread at least some reaction forces of the pulling device across a surface. The surface can include any surface upon which the pulling device 110 may be placed, including, but not limited to, a surface of a surface of a pit 402 within which the puller device is placed for pipe extraction or replacement.

In one example, the pulling device 110 is coupled to the force distributing device 130 using an engaging feature 160 such as a protruding pin. In another example, a releasable capture device 160 is used to accept and hold the engaging feature 120. Releasable capture devices 120 include, but are not limited to levers, clasps, other mechanical devices, electro-mechanical devices, and the like. In still another example, the pulling device 110 is coupled with the force distributing device 130 using one or more spring-loaded pins 160. In one example, a number of spring-loaded pins 160 are used in combination with holes 111A, 111B in the puller body 112 to facilitate adjustments. In one example, the force distributing device 130 includes two spring-loaded pins 160 used in combination with a first pair of holes 111A in the puller body 112 or a second pair of holes 111B in the puller body 112.

In one example, each of the spring-loaded pins 160 includes a housing 161 attached to the puller body 112 in some manner, including, but not limited to a threaded coupling, use of one or more fasteners, welding, or the like. The spring-loaded pin 160 includes a post portion 162 coupled to a pin 164. In this example, the post portion 162 is in the form of a T-handle to facilitate pulling of the pin 164 from within one of the holes 111A, 111B. A spring 166 is disposed around the pin 164 between a shoulder 164A of the pin 164 and an end of the housing 161 to bias the pin 164, such that the pin 164 is normally seated within one of the holes 111A, 111B. A slot 161A is included in this example that substantially matches the post portion 162 to provide an engaged position of the pin 164 when the post portion 162 is within the slot 161A. In one example, the pin 164 is pulled against the bias of the spring 166 and rotated so that the post portion 162 sits outside the slot 161A, as shown in FIG. 1, when it is desired to uncouple the pulling device 110 from the force distributing device 130. With the post portion 162 resting on the end of the housing 161, outside the slot 161A, the pin 164 is disengaged from any holes 111A, 111B, and the pulling device 110 can be removed, moved, repositioned, or otherwise maneuvered with respect to the force distributing device 130. In one example, to engage the pin 164 of the spring-loaded pin 160, the post portion 162 is rotated to line up with the slot 161A to allow the spring 166 to bias the pin 164 into engagement with one of the holes 11A, 11B. Adjustment of the pulling device 110 is facilitated with this configuration because a user does not have to hold the pin 164 against the bias of the spring 166 while adjustment of the pulling device 110 is being performed. Moreover, a simple twist of the post portion 162 returns the spring-biased pin 164 into one of the holes 111A, 111B and into engagement with the pulling device 110.

An advantage of spring-loaded pins 160 includes the security and mechanical robustness of a pin-in-hole adjustment, combined with convenience of a pin that is less likely to get lost or dropped during an adjustment because of its attachment to the puller body 112. It is noted that this is but one configuration of an example of the spring-loaded pins 160 and that further examples of spring-loaded pins having different configurations could be used in place of the above-described spring-loaded pins 160. Moreover, attachment devices other than the above-described spring-loaded pins 160 are contemplated herein, such as, but not limited to, non spring-loaded pins, fasteners such as bolts or nut and bolt combinations, and the like.

In one example, because the holes 111A, 111B are formed as through-holes in the pulling device 110, dirt or other debris often found on job sites is able to be forced or otherwise move out of the holes 111A, 111B and clear of the pin 164 during an adjustment of the pulling device 110 with respect to the force distributing device 130. This configuration provides one level of improvement over closed designs that may jam due to the presence of dirt and the like.

In one example, the pulling device 110 is configured to be coupled with the force distributing device 130 in at least two different orientations of the pulling device 110. For instance, the pulling device 110, in a first orientation, can be configured to allow the pulling device 110 to pull the flexible line 310 through one of the openings 114 (see FIG. 4) and, in a second orientation, can be configured to allow the pulling device 110 to pull the flexible line 310 through another one of the openings 114 (see FIG. 4).

Referring now to FIGS. 1 and 2, in one example, the pulling device 110 includes an engagement feature 113 for coupling the pulling device 110 to the force distributing device 130. In one example, the engagement feature 113 is a rod 113 disposed within holes 111C in the puller body 112 of the pulling device 110. In this example, the rod 113 is configured to fit within mounting notches 132 of the force distributing device 130. Engagement of the rod 113 within the mounting notches 132 of the force distributing device 130 effectively restrains a bottom of the pulling device 110. The spring-loaded clips 160, as described above, can then be selectively engaged with the holes 111A to attach the pulling device 110 in the first configuration or with the holes 111B to attach the pulling device 110 in the second configuration. It should be understood that engagement features 113 other than the rod 113 could be used in other examples of the pulling device, provided the different engagement features 113 are capable of at least assisting in restraining the pulling device within the force distributing device 130. For instance, in another example, the engagement feature 113 is an integral tab of the puller body 112 that is configured to fit within a complementary notch in the force distributing device 130.

In one example, the pulling device 110 includes another rod 115 disposed within holes 111D in the puller body 112. In one example, the holes 111D and the rod 115 are disposed between the holes 111A and 111B at a top end of the puller body 112, opposite the bottom end. The rod 115 of this example provides a grip for the user to lift, handle, manipulate, or carry the pulling device 110. Additionally, the rod 115 provides a connection point for a strap, rope, hook, or the like, for use in lowering the pulling device 110 into the pit 402, for instance.

Referring again to FIGS. 1, 2, and 7, in one example, the force distributing device 130 is configured to spread at least some reaction forces of the pulling device 110 across a surface. In one example, the force distributing device 130 includes a first force-distributing surface 140 and a second force-distributing surface 150. When placed within a pipe access pit 402, in one example, the first force-distributing surface 140 is placed against a first surface 402A, and the second force-distributing surface 150 is placed against a second surface 402B. In this example, any downward reaction forces of the pulling device 110 are distributed across the first force-distributing surface 140, and any lateral reaction forces of the pulling device 110 are distributed across the second force-distributing surface 150. In one example, the first and second force-distributing surfaces 140, 150 are substantially perpendicular to one another. In other examples, the first and second force-distributing surfaces 140, 150 are oriented at different angles with respect to one another other than perpendicular in order to accommodate first and second surfaces 402A, 402B of the pit 402 that are not roughly perpendicular. In still other examples, it is contemplated that the angle between the first and second force-distributing surfaces 140, 150 is adjustable.

In one example, at least one of the force-distributing surfaces 140, 150 of the force distributing device 130 includes a slot 134 therein configured to allow the flexible line 310 to pass therethrough. In one example, a first portion 134A of the slot 134 is disposed through the first force-distributing surface 140, and a second portion 134B of the slot 134 is disposed through the second force-distributing surface 150. In one example, the first portion 134A of the slot 134 extends across an entire length of the first force-distributing surface 140. In another example, the second portion 134B of the slot 134 extends only partially along the length of the second force-distributing surface 150. In a further example, the slot 134 includes a third portion 134C through the second force-distributing surface 150, which is essentially a through hole at the end of the second portion 134B of the slot 134. The third portion 134C, in one example, is wider than the second portion 134B of the slot 134.

In one example, the slot 134 accommodates the flexible line 310 and allows the pulling device 110 having the flexible line 310 routed therethrough to be attached to the force distributing device 130. That is, the pulling device 110 can be attached to the force distributing device 130 without uncoupling the flexible line 310 from the pulling device 110 or threading the entire length of the flexible line 310 through an opening in the force distributing device 130. Instead, in this example, only a portion of the flexible line 310 extending from the pulling device 110 is passed through the first and second portions 134A, 134B of the slot 134 while coupling or reconfiguring the pulling device 110 with the force distributing device 130. The flexible line 310 can then be passed into the third portion 134C of the slot 134 for operation of the pulling system 100.

FIG. 7 shows one example of a pipe bursting or cutting operation using pulling systems 100, devices, and components as described above. The pulling system 100 is shown including the force distributing device 130. First and second pits 402, 404 are created below a ground surface 400. In one example, the surface 400 includes a paved roadway. The first and second pits 402, 404 are shown for exit and entry of a replacement pipe 430. In one example, the pulling system 100 is placed within the first pit 402 with the first force-distributing surface 140 in contact with a first surface 402A and the second force-distributing surface 150 in contact with a second surface 402B. An existing pipe 420 is shown in place with a bursting head 410 partially through a bursting operation. A section of burst pipe 422 is shown behind the bursting head 410 with the replacement pipe 430 being pulled in behind. FIG. 7 shows a bursting heat 410 that is adapted to split a ductile pipe in addition to expanding the pipe into the surrounding soil, however the invention is not so limited. A flexible line 310 is coupled to the bursting head 410. The flexible line 310 is being pulled by the pulling system 100 through the existing pipe 420.

It is desirable when replacing a pipe to cause minimal damage to existing surfaces such as roadways. In one example, pullers and puller systems as described above are capable of pipe replacement using a relatively small pit 402. The puller 110 and force distributing device 130 described above can be constructed to be relatively small and compact, thereby enabling a relatively small pit 402 to be used with the pulling system 100. Because the pit 402 can be relatively small when using pullers 110 and systems 100 described above, the resulting patch in the surface 400, once pipe replacement is complete, is small.

In one embodiment, the pit 402 is formed in a paved roadway. Because the pit is relatively small, higher quality patch materials can be used economically. In one method, epoxy based patch materials are used to patch pits in paved roadways. Such high quality patches do not wear out as quickly as lower quality patch materials and, therefore, lessen the likelihood that such patches will cause uneven roadways after pipe replacement.

As discussed above, in one embodiment, the puller 110 is reversible. One advantage of a reversible puller 110 includes a time savings in bursting or cutting operations. After a flexible line 310 is pulled through an existing pipe 420 to complete an operation, the end of the flexible line 310 can be reinserted into the next segment of existing pipe to be replaced without reversing the flexible cable 310 all the way through the puller 110. There is no need to re-thread the cable over the drums of the puller 110. In reversible embodiments, the puller 110 is simply re-oriented on the force distributing device 130. The puller 110 is then operated with the drive motors in the reverse direction. This process can be repeated as many times as necessary to burst or split several consecutive segments of pipe.

Figure 8:
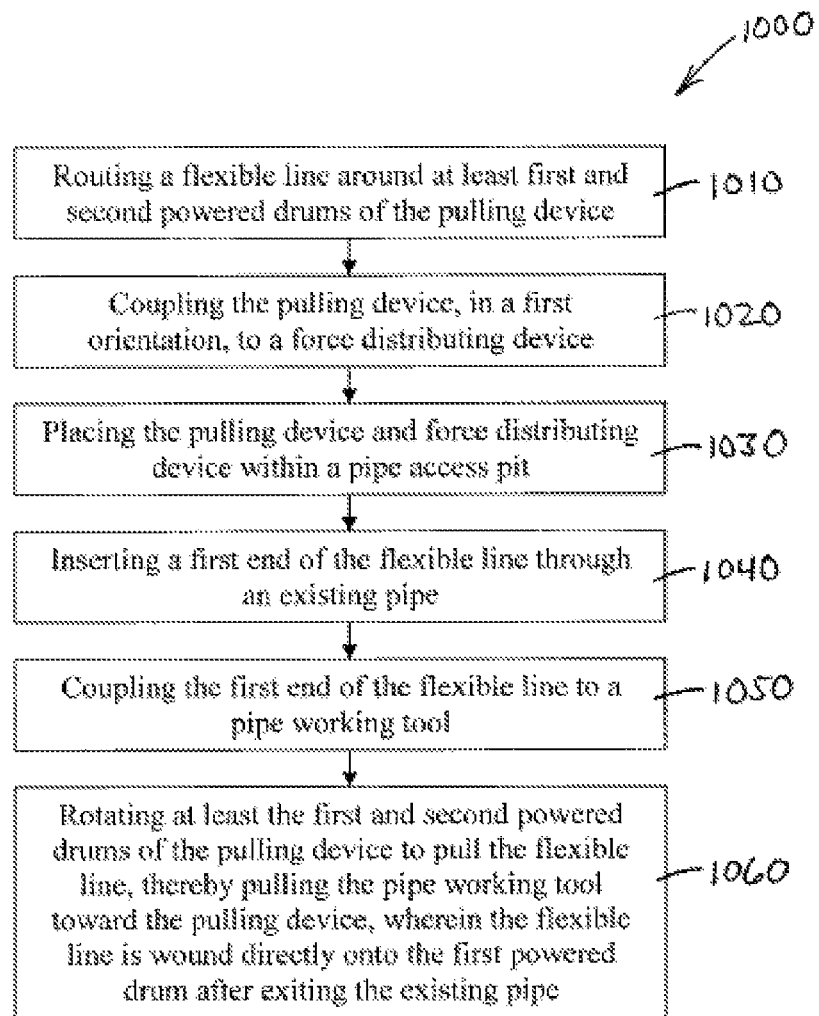
FIG. 8 shows a method of using a pulling device according to an embodiment of the invention.

Referring to FIG. 8 (with additional reference to FIGS. 1, 5, 6, and 7), in another example, a method 1000 of using a pulling device 110 includes, at 1010, routing a flexible line 310 around at least first and second powered drums 120, 122 of the pulling device 110. In one example, at 1020 the pulling device 110 is coupled, in a first orientation, to a force distributing device 130. In one example, as described above, spring-loaded pins 160 are used to engage within holes 111A of the puller body 112 to couple the pulling device 110 in the first orientation with respect to the force distributing device 130. At 1030, the pulling device 110 and force distributing device 130 are placed within a pipe access pit 402. At 1040, a first end of the flexible line 310 is inserted through an existing pipe 420. At 1050, the first end of the flexible line 310 is coupled to a pipe working tool 410. At 1060, at least the first and second powered drums 120, 122 of the pulling device 110 are rotated to pull the flexible line 310, thereby pulling the pipe working tool 410 toward the pulling device 110. In one example, the flexible line 310 is wound directly onto the first powered drum 120 after exiting the existing pipe 420. That is, in this example, the flexible line 310 is wound onto the first powered drum 120 immediately or substantially immediately after passing through an opening 114 in the puller body 112.

In one example, the method 1000 further includes removing the pulling device 110 from the force distributing device 130. For instance, in one example, the spring-loaded clips 160 are disengaged from within the holes 111A to allow removal of the pulling device 110 from the force distributing device 130. The pulling device 110 is then coupled, in a second orientation, to the force distributing device 130. For instance, the spring-loaded clips 160 can be re-engaged with the holes 111B to couple the pulling device 110, in the second orientation, to the force distributing device 130. A second end of the flexible line 310 is inserted through another existing pipe 420. The second end of the flexible line 310 is coupled to a pipe working tool 410. At least the first and second powered drums 120, 122 of the pulling device 110 are rotated in a reverse direction (that is, in a direction opposite the rotational direction of the first and second powered drums 120, 122 when the pulling device 110 is attached to the force distributing device 130 in the first orientation) to pull the flexible line 310, thereby pulling the pipe working tool 410 toward the pulling device 110. In one example, the flexible line 310 is wound directly onto the first powered drum 120 after exiting the existing pipe 420. That is, as with the above example, the flexible line 310 is wound onto the first powered drum 120 immediately or substantially immediately after passing through another opening 114 in the puller body 112.

In one example, routing the flexible line 310 around at least the first and second powered drums 120, 122 includes routing the flexible line 310 around an intermediate roller 124 disposed within the pulling device 110 between the first and second drums 120, 122. In one example, as described above, the intermediate roller 124 is canted with respect to an axis of rotation 120' or 122' of at least one of the first and second drums 120, 122.

In one example, placing the pulling device 110 and force distributing device 130 within the pipe access pit 402 includes placing a first force-distributing surface 140 against a first surface 402A of the pit 402 and placing a second force-distributing surface 150 against a second surface 402B of the pit 402. In this example, the first and second force-distributing surfaces 140, 150 are substantially perpendicular to each other. In other examples, the first and second force-distributing surfaces 140, 150 are oriented at different angles with respect to one another. In still other examples, it is contemplated that the angle between the first and second force-distributing surfaces 140, 150 is adjustable in order to accommodate first and second surfaces 402A, 402B of the pit 402 that are not roughly perpendicular.

Pullers and systems using pullers as described above can be made very lightweight and portable. In one embodiment, a puller system weighs less than 65 lbs. and can be disassembled into a number of component parts. Even a single user is therefore easily able to move such a puller or puller system in a small vehicle such as a pickup truck to a job site and assemble the puller system.

The above description is intended to be illustrative, and not restrictive. For example, the above-described examples (or one or more aspects thereof) may be used in combination with each other. Combinations of the above embodiments, and other embodiments will be apparent to those of skill in the art upon reviewing the above description. Other embodiments can be used, such as by one of ordinary skill in the art upon reviewing the above description. While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention includes any other applications in which the above structures and fabrication methods are used. The scope of the invention should be determined with reference to the appended claims, along with the full scope of equivalents to which such claims are entitled.

What is claimed is:

1. A pulling device, comprising:
   a pair of drums, each drum being driven by a corresponding motor and gear reduction system; and
   an intermediate roller fixed at a location and orientation between the pair of drums, to guide a flexible line between the pair of drums wherein an axis of rotation of the intermediate roller is canted with respect to an axis of rotation of at least one of the pair of drums.

2. The pulling device of claim 1, wherein the intermediate roller includes a grooved outer surface.

3. The pulling device of claim 1, wherein the pair of drums each include a grooved outer surface.

4. The pulling device of claim 1, wherein the gear reduction system includes a harmonic drive system.

5. The pulling device of claim 1, wherein the gear reduction system includes a planetary gear system.

6. A pulling system, comprising:
   a pulling device, including:
      a pair of drums, each drum being driven by a corresponding motor and gear reduction system;
      an intermediate roller fixed at a location and orientation between the pair of drums, to guide a flexible line between the pair of drums wherein an axis of rotation of the intermediate roller is canted with respect to an axis of rotation of at least one of the pair of drums; and
   a force distributing frame, wherein the pulling device is coupled to the force distributing frame using a releasable capture device.

7. The pulling system of claim 6, wherein the pulling device is coupled to the force distributing frame using a spring loaded pin.

8. The pulling system of claim 6, wherein the pulling device is reversible within the force distributing frame to facilitate pulling of the flexible line multiple times without rewinding the flexible line on the pair of drums.

9. The pulling system of claim 6, wherein the force distributing frame includes a first force-distributing surface, and a second force-distributing surface substantially perpendicular to the first force-distributing surface.

10. The pulling system of claim 9, wherein at least one of the force-distributing surfaces of the force distributing device includes a slot to allow the flexible line to pass therethrough.

11. The pulling system of claim 6, wherein the motors coupled to the pair of drums are hydraulic motors.

12. A pulling system, comprising:
a pulling device, including:
a pair of drums, each drum being driven by a corresponding motor and harmonic drive gear reduction systems;
an intermediate roller fixed at a location and orientation between the pair of drums, to guide a flexible line between the pair of drums wherein an axis of rotation of the intermediate roller is canted with respect to an axis of rotation of at least one of the pair of drums; and
a force distributing frame, wherein the pulling device is coupled to the force distributing frame using a releasable capture device.

13. The pulling system of claim 12, wherein the intermediate roller includes a grooved outer surface.

14. The pulling system of claim 12, wherein the pair of drums each include a grooved outer surface.

15. The pulling system of claim 12, wherein the pulling device is coupled to the force distributing frame using a spring loaded pin.

16. The pulling system of claim 12, wherein the pulling device is reversible within the force distributing frame to facilitate pulling of the flexible line multiple times without rewinding the flexible line on the pair of drums.

17. The pulling system of claim 12, wherein the force distributing frame includes a first force-distributing surface, and a second force-distributing surface substantially perpendicular to the first force-distributing surface.

* * * * *